United States Patent
Araki et al.

(10) Patent No.: US 7,643,250 B2
(45) Date of Patent: Jan. 5, 2010

(54) PAD SLIDER DESIGN FOR ON-SLIDER ELGS

(75) Inventors: Satoru Araki, San Jose, CA (US); Alexander Driskill-Smith, Mountain View, CA (US); David Seagle, Morgan Hill, CA (US); Xiao Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 528 days.

(21) Appl. No.: 11/340,888

(22) Filed: Jan. 27, 2006

(65) Prior Publication Data

US 2007/0177305 A1    Aug. 2, 2007

(51) Int. Cl.
    *G11B 5/60* (2006.01)
(52) U.S. Cl. .................................. 360/234.5
(58) Field of Classification Search .......... None
    See application file for complete search history.

(56) References Cited

U.S. PATENT DOCUMENTS

| | | | |
|---|---|---|---|
| 5,023,991 A | 6/1991 | Smith | |
| 5,494,473 A | 2/1996 | Dupuis et al. | |
| 6,034,849 A | 3/2000 | Takizawa | |
| 6,551,173 B2 | 4/2003 | Boutaghou | |
| 6,623,330 B2 | 9/2003 | Fukuroi | |
| 6,728,067 B2 | 4/2004 | Crawforth et al. | |
| 6,793,557 B2 | 9/2004 | Bunch et al. | |
| 6,945,847 B2 | 9/2005 | Ota et al. | |
| 7,272,883 B2 * | 9/2007 | Le et al. | 29/603.16 |
| 2004/0240109 A1 | 12/2004 | Hamann et al. | |
| 2004/0259474 A1 | 12/2004 | Oyama et al. | |
| 2005/0036238 A1 | 2/2005 | Tabakovic et al. | |
| 2005/0047016 A1 | 3/2005 | Koide et al. | |
| 2005/0094316 A1 | 5/2005 | Shiramatsu et al. | |
| 2005/0128638 A1 | 6/2005 | Koeppe et al. | |
| 2005/0185345 A1 * | 8/2005 | Ding et al. | 360/319 |
| 2005/0219753 A1 | 10/2005 | Yamakura et al. | |
| 2007/0035881 A1 * | 2/2007 | Burbank et al. | 360/234.3 |

FOREIGN PATENT DOCUMENTS

| | | |
|---|---|---|
| JP | 11242806 | 9/1999 |
| JP | 2005011414 | 1/2005 |

\* cited by examiner

*Primary Examiner*—Mark Blouin
(74) *Attorney, Agent, or Firm*—Patterson & Sheridan, L.L.P.

(57) ABSTRACT

One embodiment of the present invention provides a slider including a slider body, a magnetic reader disposed on the slider body, a magnetic writer disposed on the slider body, and an electronic lapping guide disposed on the slider body. The slider also includes a first row of contact pads disposed on the slider body and coupled to the magnetic reader and the magnetic writer and a second row of contact pads disposed on the slider body and coupled to the electronic lapping guide. The electronic lapping guide may be electrically isolated from the magnetic reader and magnetic writer.

23 Claims, 11 Drawing Sheets

PAD SLIDER DESIGN FOR ON-SLIDER ELGS

BACKGROUND OF THE INVENTION

1. Field of the Invention

Embodiments of the present invention generally relate to manufacture of magnetic heads for data storage devices.

2. Description of the Related Art

Modern computer systems typically include a mass storage device such as a hard disk drive. Each hard disk drive typically includes a hard disk (or in some cases, multiple hard disks) which spins underneath a slider. A read/write head (or in some cases, a plurality of read/write heads) may be mounted on the slider, and the slider may in turn be mounted on an arm which may be actuated with respect to the disk, allowing data stored in magnetic disk media of the disk to be accessed via the read/write head (e.g., by reading magnetically stored data from or writing data magnetically to the disk media).

In some cases, the slider may also include one or more electronic lapping guides (ELGs) and a heater. The one or more ELGs have a resistance that varies (increases) as material is removed during a lapping process and thus may be used to monitor lapping during slider manufacturing. In other words, an ELG may be formed on the slider surface and the ELG resistance may be monitored in an effort to smooth the surface of the slider and establish the final dimensions of the slider. In some cases, the heater (also referred to as a thermal flyheight modulation heater) may be used to more precisely control the height at which the read/write head flies over the hard disk. For example, by heating a portion of the slider, thermal expansion may cause the slider to move closer to the hard disk surface, thereby enabling a fine adjustment of the slider's fly height and providing the ability to increase the sensitivity of the read/write head with respect to the hard disk.

In order to access the elements mounted on the slider (the read head, the write head, the heater, and the one or more ELGs), a plurality of contact pads may be provided on the slider and connected to the elements. Some of the contact pads and slider elements may be used during operation of the hard disk drive, e.g., the contact pads for the read head, write head, and heater may be used to perform disk access operations. However, some of the contact pads and slider elements may only be used during manufacture of the hard disk drive (e.g., the contact pads for the one or more ELGs). In some cases, the contact pads and slider elements utilized during manufacture of the hard disk drive may undesirably interfere with the contact pads and the slider elements which are utilized during operation of the hard disk drive (e.g., by being inadvertently electrically activated, e.g., due to a short, during operation of the hard disk drive).

Accordingly, what is needed are improved sliders and methods for manufacturing and operating sliders which prevent the contact pads and slider elements utilized during manufacture of the hard disk drive from interfering with the contact pads and the slider elements which are utilized during operation of the hard disk drive.

SUMMARY OF THE INVENTION

One embodiment of the present invention provides a slider including a slider body, a magnetic reader disposed on the slider body, a magnetic writer disposed on the slider body, an electronic lapping guide disposed on the slider body, a first row of contact pads disposed on the slider body and coupled to the magnetic reader and the magnetic writer, and a second row of contact pads disposed on the slider body and coupled to the electronic lapping guide. The electronic lapping guide may be electrically isolated from the magnetic reader and magnetic writer.

Embodiments of the invention also provide a disk drive including a magnetic disk, an arm rotatably mounted to move over the magnetic disk, and a slider connected to an end of the arm. The slider includes a magnetic reader in a first level of a substrate, a magnetic writer in a second level of the substrate, an electronic lapping guide in the first level of the substrate, a first row of contact pads coupled to the magnetic reader and the magnetic writer, and a second row of contact pads coupled to the electronic lapping guide. The electronic lapping guide may be electrically isolated from the magnetic reader and magnetic writer.

Embodiments of the invention also provide a method of manufacturing a slider. The method includes forming at least one heater, at least one reader, at least one electronic lapping guide, and at least one writer on the slider. The method also includes forming a first row of contact pads on the slider, wherein the first row of contact pads is coupled to the at least one heater, at least one reader, and at least one writer and forming a second row of contact pads on the slider, wherein the second row of contact pads is coupled to the at least one electronic lapping guide. The at least one electronic lapping guide may be electrically isolated from the at least one heater, the at least one reader, and the at least one writer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the present invention provides a slider including a slider body, a magnetic reader disposed on the slider body, a magnetic writer disposed on the slider body, and an electronic lapping guide disposed on the slider body. The slider also includes a first row of contact pads disposed on the slider body and coupled to the magnetic reader and the magnetic writer and a second row of contact pads disposed on the slider body and coupled to the electronic lapping guide. The electronic lapping guide may be electrically isolated from the magnetic reader and magnetic writer. By providing separate rows of contacts for the reader and writer and the electronic lapping guide, the connection for the electronic lapping guide may not interfere with the connection for the reader and writer. Furthermore, by isolating the reader and writer from the electronic lapping guide, the electronic lapping guide may not interfere with operation, e.g., of a disk drive containing the slider, as described in greater detail below.

Hard Disk Drive Overview

Figure 1:
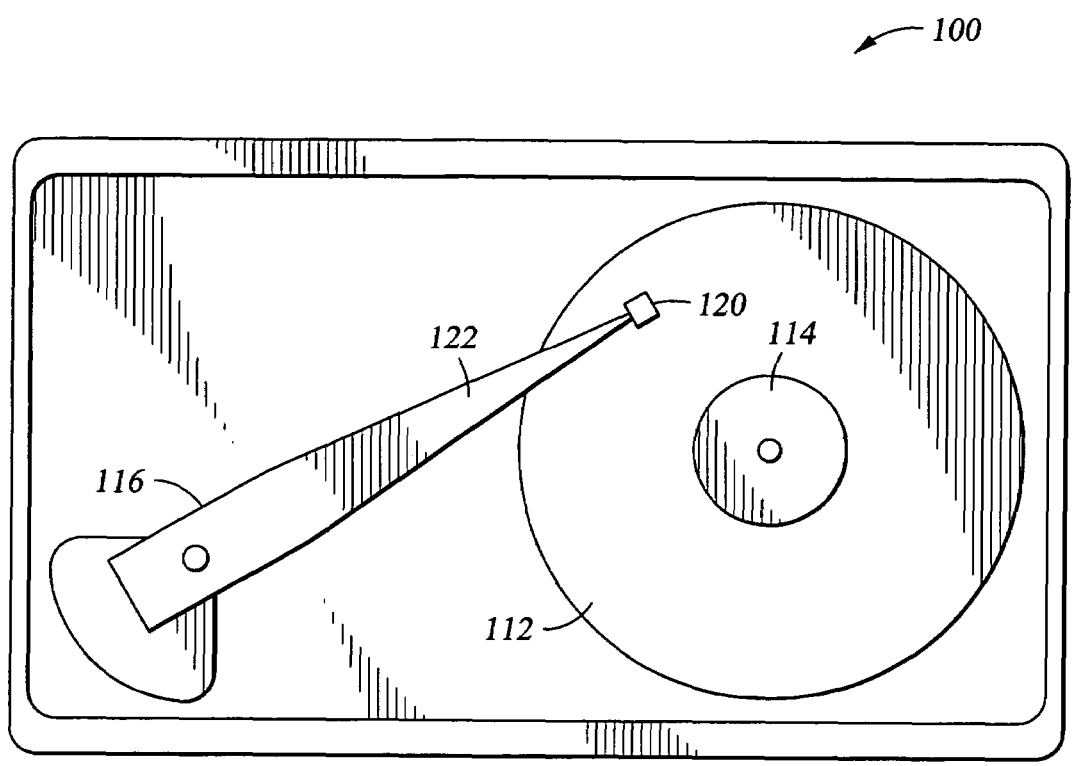
FIG. 1 illustrates a hard disk drive that includes a magnetic media hard disk mounted upon a motorized spindle.

FIG. 1 illustrates a hard disk drive 100 that includes a magnetic media hard disk 112 mounted upon a motorized spindle 114. An actuator arm 116 is pivotally mounted within the hard disk drive 100 with a slider 120 disposed upon a distal end 122 of the actuator arm 116. During operation of the hard disk drive 100, the hard disk 112 rotates upon the spindle 114 and the slider 120 acts as an air bearing surface (ABS) adapted for flying above the surface of the disk 112. As described hereinafter, the slider 120 includes a substrate base upon which various layers and structures that form a magnetic reader and writer are fabricated. Thus, magnetic read/write heads disclosed herein can be fabricated in large quantities upon a substrate and subsequently sliced into discrete magnetic read/write heads for use in devices such as the hard disk drive 100.

Manufacture of the Slider

Figure 2:
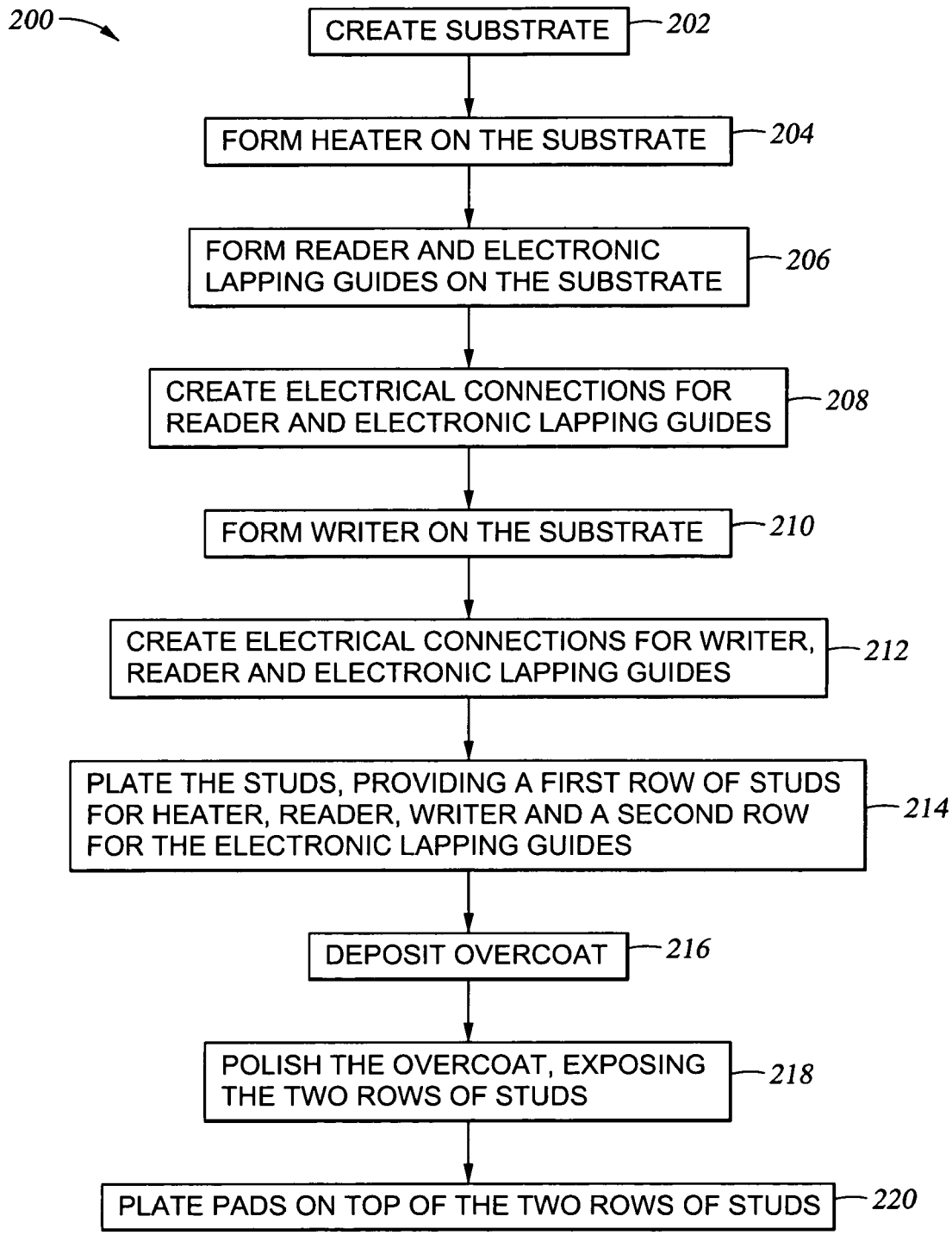
FIG. 2 is a flow diagram depicting a process for manufacturing a slider according to one embodiment of the invention.
Figure 3:
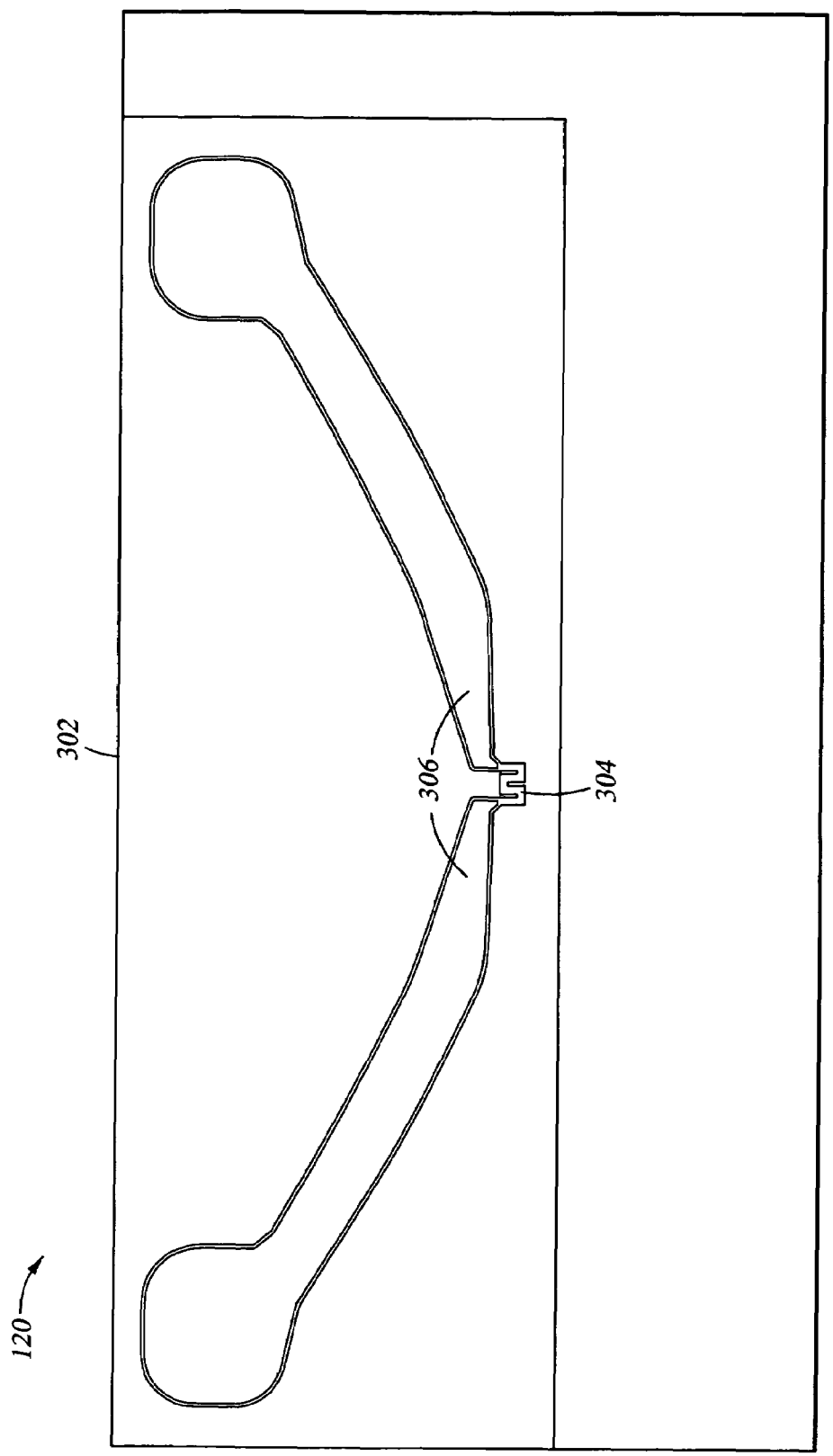
FIG. 3 is a block diagram depicting a heater and electrical connections according to one embodiment of the invention.

For some embodiments, the slider 120 may contain two rows of contacts. A first row of contacts may be provided for slider elements utilized during operation of the hard disk drive 100 while a second row of contacts may be provided for slider elements (e.g., ELGs) utilized during manufacture of the slider 120. By providing a second row of separate contacts for slider ELGs, the ELGs may be electrically isolated from other slider elements during operation of the hard disk drive 100 and connections to the second row of contacts (used, e.g., during manufacture of the hard disk drive 100) may not interfere with connections to the first row of contacts (used, e.g., during operation of the hard disk drive 100). FIG. 2 is a flow diagram depicting a process 200 for manufacturing a slider 120 according to one embodiment of the invention. Various steps of the process 200 are described below with reference to FIGS. 3-9 which illustrate various resulting layers of the slider 120 during manufacture according to one embodiment of the invention.

The process 200 may begin at step 202 where a substrate for the slider 120 is created. At step 204, and as depicted, for example, in FIG. 3, a heater 304 may be created on the substrate 302 along with electrical connections 306 for the heater 304. As described above, during operation of the hard disk drive 100, the heater 304 may be used to more precisely control the height at which the read/write head flies over the disk 112, For example, by heating a portion of the slider 120, thermal expansion may cause the slider 120 to move closer to the hard disk surface, thereby enabling a fine adjustment of the slider's fly height.

Figure 4:
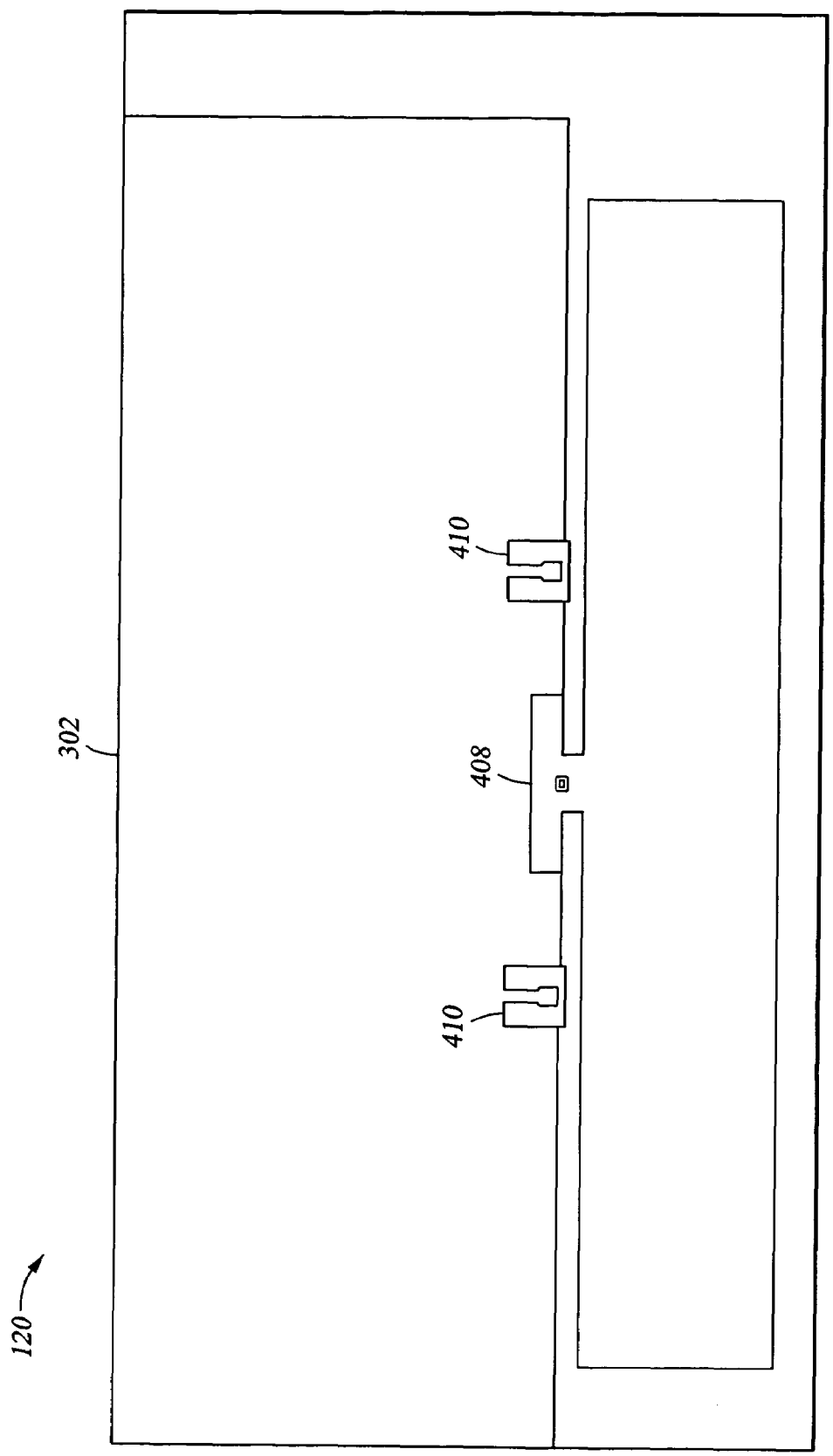
FIG. 4 is a block diagram depicting a reader and electronic lapping guides (ELGS) according to one embodiment of the invention.
Figure 5:
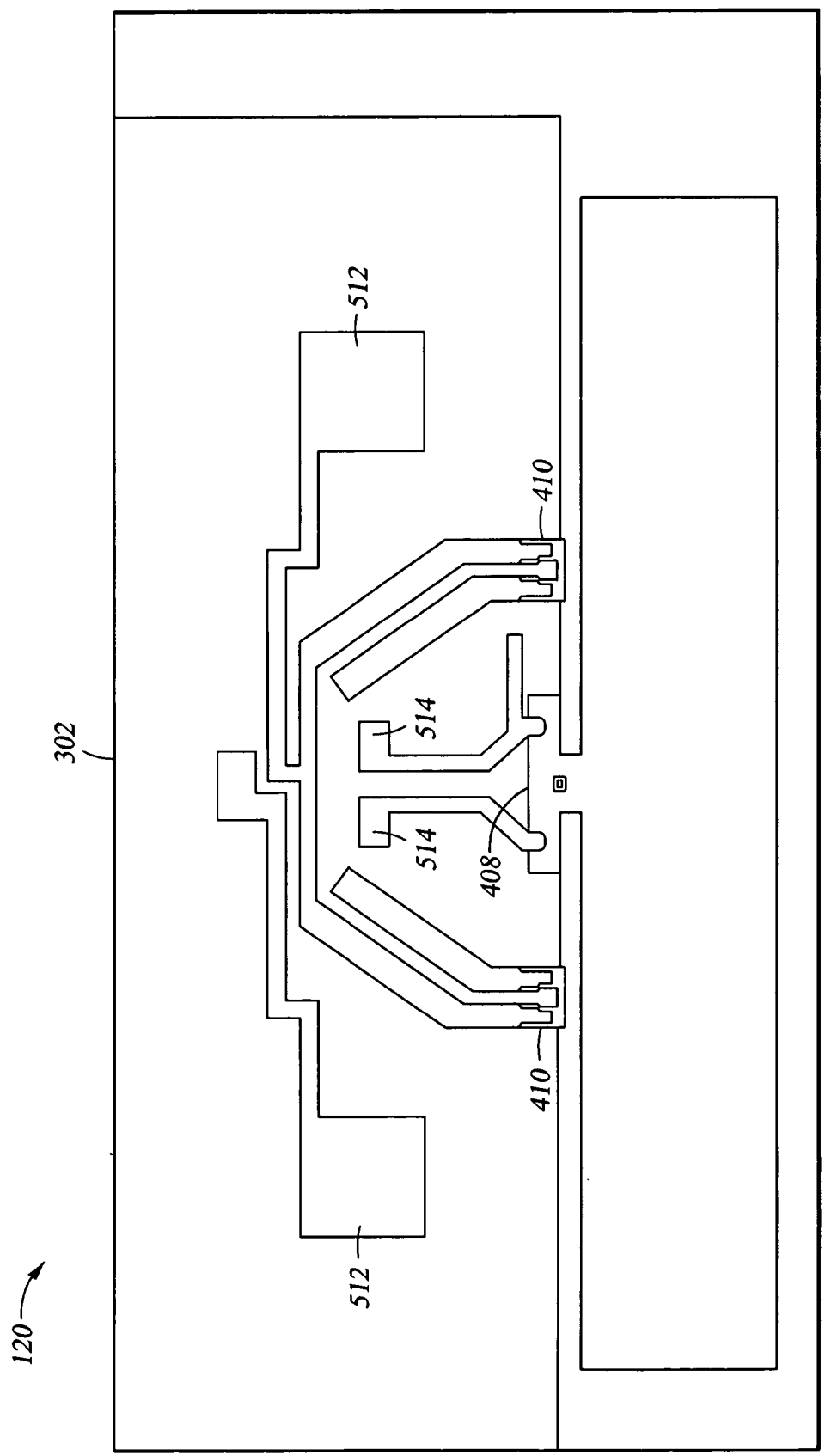
FIG. 5 is a block diagram depicting electrical connections for the reader and ELGs according to one embodiment of the invention.

At step 206, and as depicted, for example, in FIG. 4, the reader 408 and electronic lapping guides (ELGs) 410 may be formed on the substrate 302 (for convenience, the heater 304, which may be in a separate layer from the ELGs 410 and the reader 408, is not shown in FIG. 4). The reader 408 may be utilized for reading data stored in the magnetic media hard disk 112 while the ELGs 410 may be utilized for monitoring the lapping process as described above and below in greater detail. Then, at step 208, and as depicted, for example, in FIG. 5, electrical connections 512, 514 may be created for the reader 408 and the ELGs 410.

Figure 6:
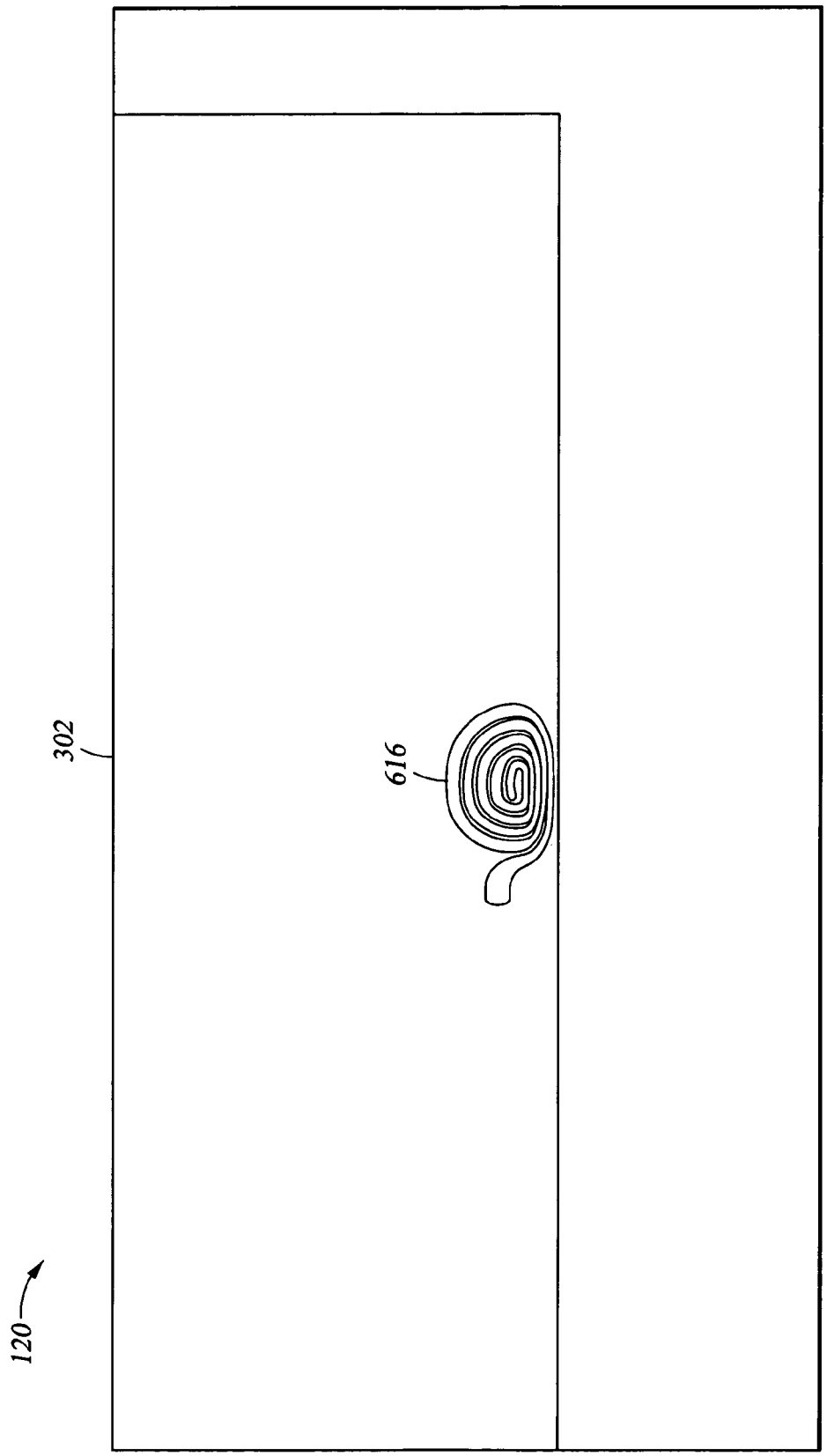
FIG. 6 is a block diagram depicting a writer according to one embodiment of the invention.
Figure 7:
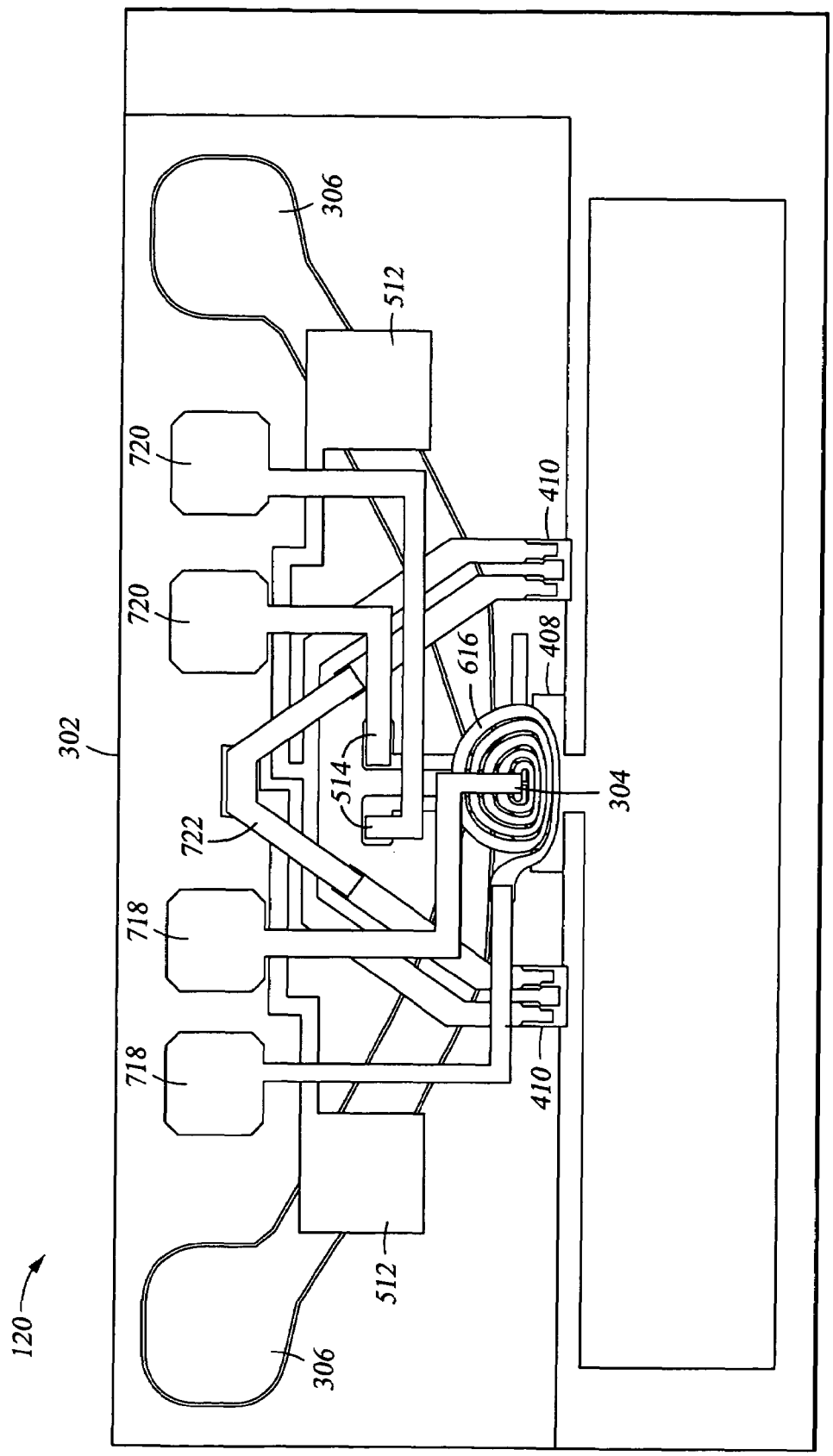
FIG. 7 is a block diagram depicting electrical connections for the reader, ELGs, and writer according to one embodiment of the invention.

At step 210, and as depicted, for example, in FIG. 6, the writer 616 may be formed on the substrate 302 (again, for convenience, the heater 304, reader 408, and ELGs 410, which may be in a separate layer from the writer 616, are not shown). The writer 616 may be utilized for writing data to the magnetic media hard disk 112. At step 212, and as depicted, for example, in FIG. 7, further electrical connections 718, 720, 722 for the writer 616, reader 408, and ELGs 410 may be created.

Figure 8:
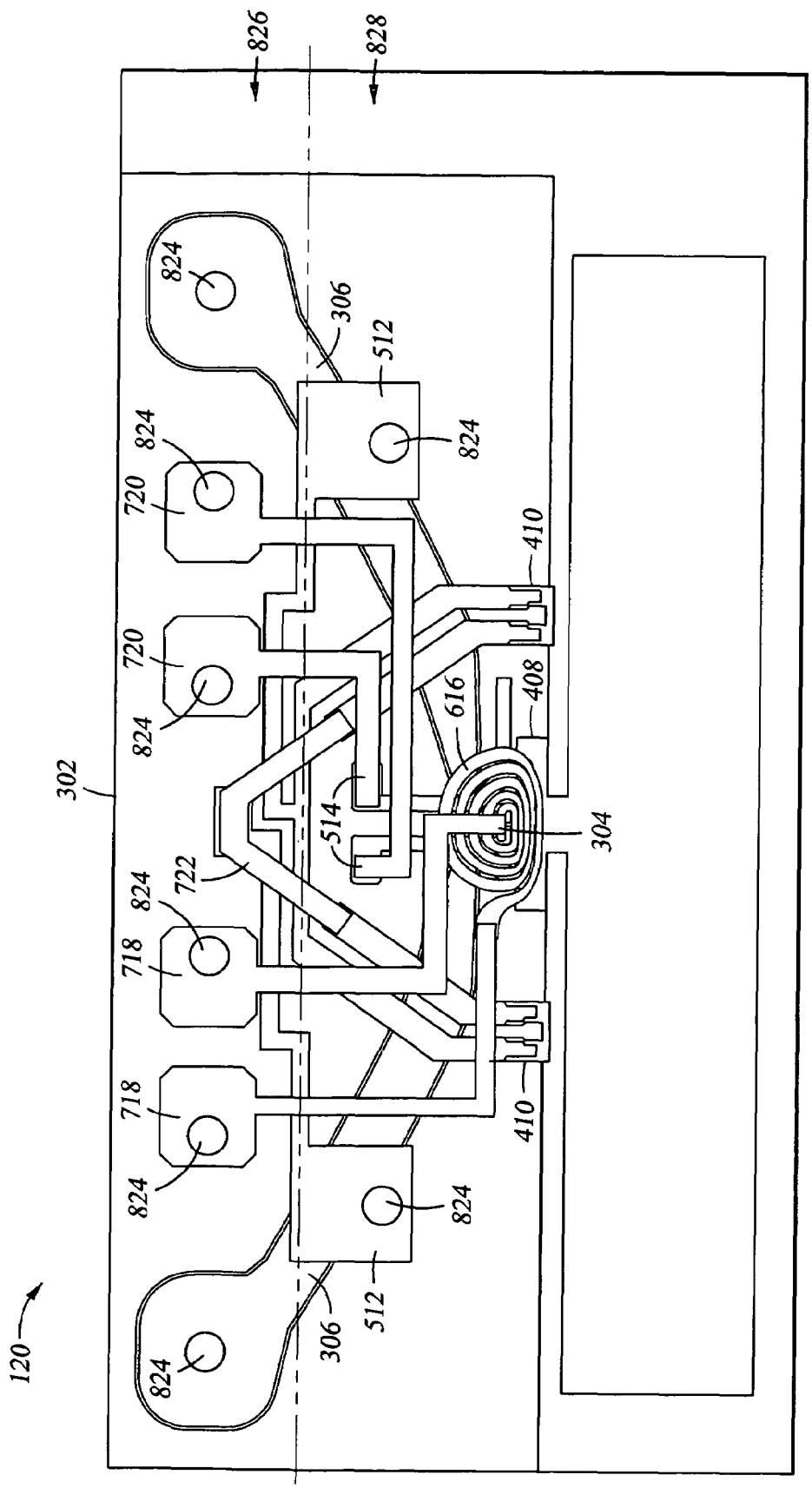
FIG. 8 is a block diagram depicting studs connected to the heater, reader, writer, and ELG connections according to one embodiment of the invention.
Figure 9:
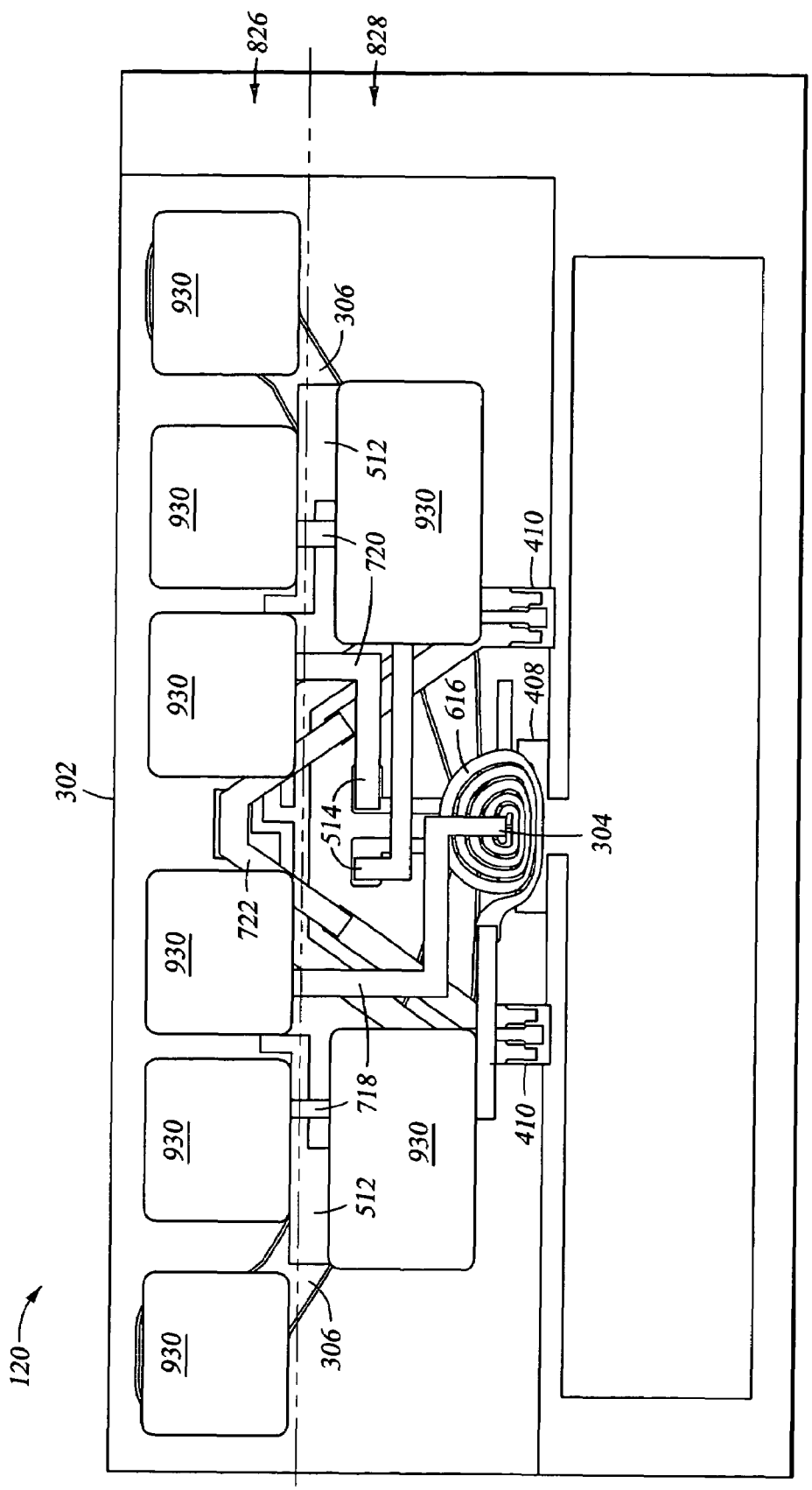
FIG. 9 is a block diagram depicting pads for the heater, reader, writer, and ELG connections according to one embodiment of the invention.

At step 214, and as depicted, for example, in FIG. 8, studs 824 may be plated onto the substrate (e.g., to the connections 306, 512, 718, 720 for the heater 304, reader 408, ELGs 410, and writer 616), forming a first row 826 of connections for the heater 304, reader 408, and writer 616 and a second row 828 of connections for the ELGs 410. In one embodiment of the invention, the studs 824 may be copper. Optionally, other conductive materials may be utilized. The first row 826 of connections may be located at or near the edge of the slider 120 (e.g., at or near the edge of the slider 120 opposite the heater 304, reader 408, writer 616, and ELGs 408) while the second row 828 of connections may be provided below the first row 826 of connections (e.g., at or near an interior area of the slider 120, between an air bearing surface (ABS) of the slider 120 and the first row 826 of connections). Also, as depicted, the first row 826 of connections may be parallel to the second row 828 of connections. In one embodiment, the first row 826 of connections may be non-overlapping with the second row of connections. Also, in one embodiment, the first row 826 of connections may be co-planar with the second row 828 of connections (e.g., the connections may be disposed on the same, planar surface of the slider 120). As described below, by providing a first row 826 of connections for elements which are active during operation of the hard disk drive 100 and by providing a second row 828 of connections for elements which are used during manufacturing of the hard disk drive 100 but which are inactive during operation of the hard disk drive 100, the second row 828 of connections may, in some cases, be prevented from interfering (e.g., via shorts or other electrical interference) with the first row 826 of connections.

At step 216, an overcoat may be deposited on the substrate 302 and other components. In one embodiment, the overcoat may be an insulator. For example, the overcoat may be alumina. Optionally, other insulators may be utilized. Then, at step 218, the overcoat may be polished, exposing the two rows 826, 828 of studs 824. Finally, at step 220, and as depicted, for example, in FIG. 9, pads 930 may be plated on top of the two rows 826, 828 of exposed studs 824. In one embodiment of the invention, the pads 930 may be gold pads. Optionally, another conductor may also be used for the pads 930. The pads 930 may be used to form connections with elements of the slider 120 as described below.

Figure 10:
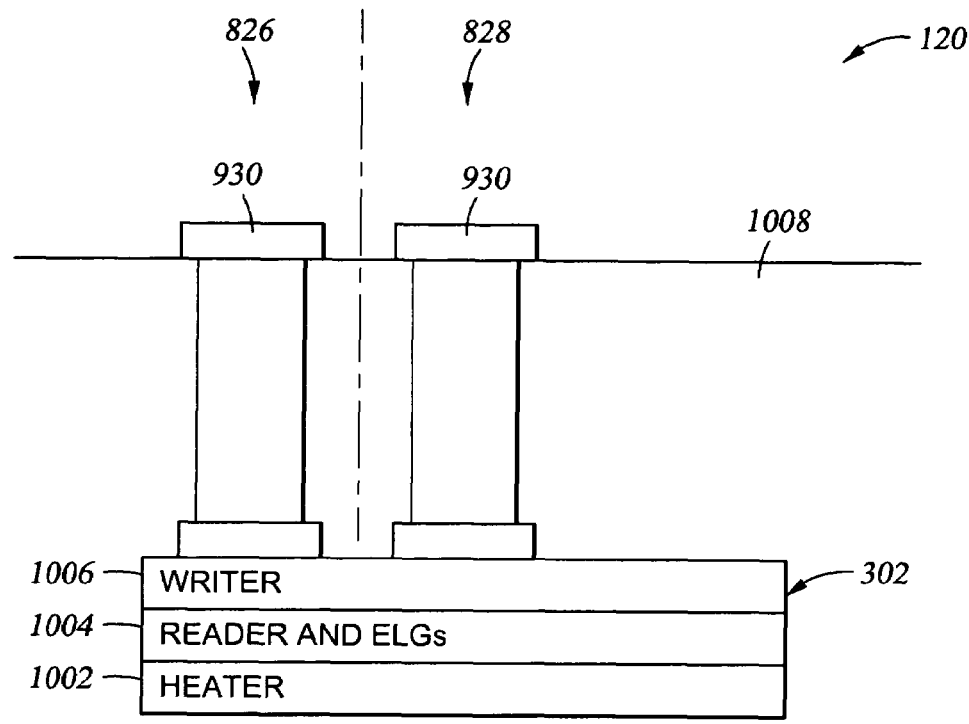
FIG. 10 is a block diagram depicting a side view of a slider according to one embodiment of the invention.

FIG. 10 is a block diagram depicting a side view of the slider 120 according to one embodiment of the invention. As depicted, the heater 304 may be contained in a first layer 1002, the reader 408 and ELGs 410 may be contained in a second layer 1004, and the writer 616 may be contained in a third layer 1006. Also depicted are the studs 824 (surrounded by the overcoat 1008) and plates 930 arranged in a first row 826 and a second row 828 of connections. While not depicted in FIG. 10, the slider 120 may also include layers of electrical connections (described above with respect to FIGS. 3-9) and insulation between the slider components as well as other layers and components known to those skilled in the art.

Use of the Electronic Lapping Guides During Manufacturing

In one embodiment of the invention, the ELGs 410 may be utilized for lapping of the slider 102. As described above, the ELGs 410 may be used to monitor a lapping process during slider manufacturing. Lapping may be performed in an effort to smooth the surface of the slider 120 and establish the final dimensions of the slider 120. The ELGs 410 have a resistance that varies (increases) as material from the ELG 410 is removed during the lapping process. Thus, the ELG resistance may be monitored to determine when the lapping has sufficiently smoothed and dimensioned the slider 120.

During the lapping process, the second row 828 of pads 930 for the ELGs 410 may be mechanically bonded, e.g., using gold wire, in order to measure the resistance of the ELGs 410. In some cases, while the second row 828 of pads 930 is bonded, e.g., during a lapping process, the first row 826 of pads 930 may remain electrically disconnected from other elements (e.g., the pads 930 may not be bonded, soldered, or otherwise electrically connected to other circuitry). After the lapping process is finished, the second row 828 of pads 930 for the ELGs 410 may be de-bonded, thereby disconnecting the pads 930. The first row 826 of pads 930 may then be connected, e.g., by soldering. The soldered connection to the first row 826 of pads 930 may then be used to access components which are utilized during operation of the hard disk drive 100 (e.g., the heater 304, reader 408, and writer 616).

By providing a first row 826 of connections which are utilized during operation of the hard disk drive 100 and a second row 828 of connections which are utilized during manufacture of the hard disk drive 100, the second row 828 of connections may be prevented from interfering with the first row 826 of connections. As an example, separate connections for the heater 304, reader 408, ELGs 410, and writer 616 may provide electrical isolation between the elements such that operation of one of the elements may not interfere with operation of another of the elements. For example, by providing separate connections for the ELGs 410 and the heater 304 (or separate connections for the ELGs 410 and the writer 616), the relative resistance of the heater 304 with respect to the ELGs 410 may not interfere with measurement of the ELG resistance during the lapping process. Also, in some cases, where de-bonding is performed, traces of the wires used to connect to and measure the ELG resistance may remain, e.g., on the second row 828 of pads 930. By providing a separate, first row 826 of pads 930, a clean surface of connections in the first row 826, unaffected by de-bonding, may be provided for use in soldering connections for other components (e.g., the heater 304, reader 408, and writer 616). In one embodiment, de-bonding may only be performed on pads which are not soldered.

Figure 11:
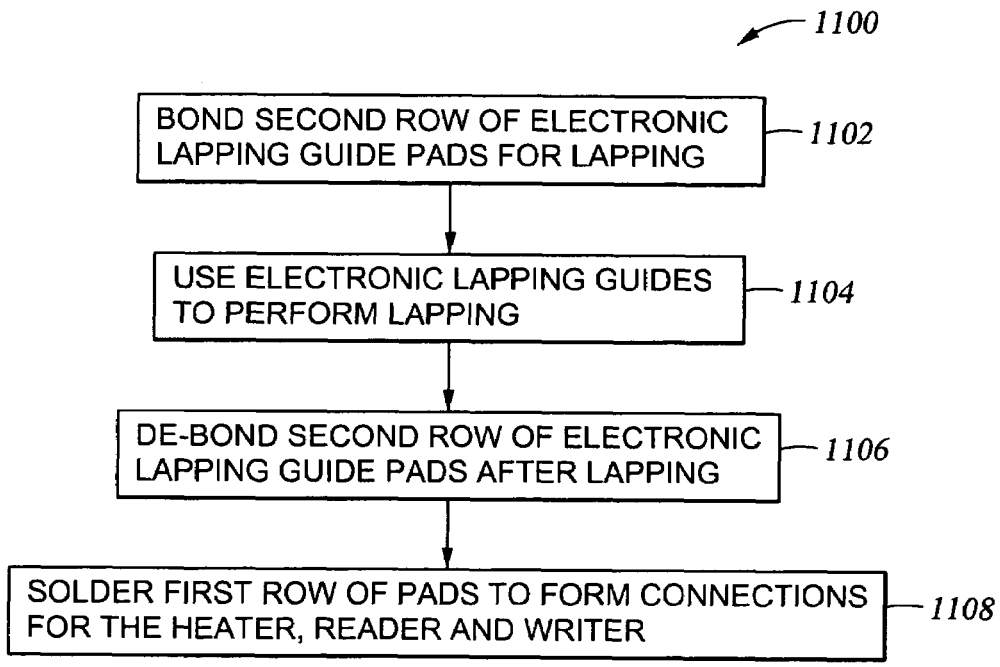
FIG. 11 is a flow diagram depicting a process for using ELGs during a lapping process according to one embodiment of the invention.

FIG. 11 is a flow diagram depicting a process 1100 for using ELGs 410 for lapping according to one embodiment of the invention. As depicted, the process 1100 may begin at step 1102 where the second row 828 of connection pads 930 for the ELGs 410 are bonded for use in lapping. As described above, in one embodiment, wire bonding, e.g., with gold wire, may be utilized to mechanically bond the second row 828 of connection pads 930 for the ELGs 410 for using in lapping. The mechanical bond to the second row 828 of connection pads 930 for the ELGs 410 may then be utilized to perform lapping (e.g., to measure the resistance of the ELGs 410 during the lapping process, as described, for example, above) at step 1104.

In some cases, after the second row 828 of contact pads 930 is utilized during the lapping process (e.g., to smooth and dimension the slider 120), the mechanical bonds to the second row 828 of contact pads 930 may no longer be necessary. Also, as described above, the mechanical bonds may, in some cases, undesirably interfere with the first row 826 of contact pads 930 and the slider elements which are utilized during operation of the hard disk drive (e.g., by causing the ELGs 410 to be inadvertently electrically activated, e.g., due to a short, during operation of the hard disk drive 100). Thus, at step 1106, after the lapping has been performed, the second row 828 of pads 930 for the ELGs 410 may be de-bonded (e.g., the wire bonds, where used for bonding, may be severed). In some cases, debonding the ELGs 410 may leave remnants of wire bonds or imperfections on one or more of the second row 828 of pads 930 (e.g., on each of the second row 828 of pads 930).

Then, after lapping and de-bonding is complete, at step 1108, the first row 826 of pads 930 may be soldered to form connections for the heater 304, reader 408, and writer 616. Where remnants of wire bonds or imperfections are left on the second row 828 of contact pads 930, the first row 826 of contact pads 930 may remain unaffected, possibly avoiding inadvertent connections (e.g., shorts) described above.

In some cases, additional ELGs not located on the slider 120 may be utilized for performing lapping. For example, during a first lapping phase (e.g., rough lapping) ELGs which are not mounted on the slider 120 may be used for lapping. Then, during the second lapping phase, ELGs 410 on the slider 120 may be used for finer lapping. Also, as described below, in some cases, additional ELGs and/or connections may be provided on the slider 120.

Operation of the Disk Drive

As described above, by providing separate pads 930 for the ELGs 410, the ELGs 410 may remain electrically isolated from other elements on the slider 120 e.g., during manufacturing and during operation of the hard disk drive 100. Such electrical isolation may provide several benefits. Also, as described above, during manufacturing (e.g., lapping), the electrical isolation may prevent the resistance of other elements (e.g., the heater 304) from interfering with measurement of the ELG resistance. Furthermore, during operation of the hard disk drive 100, the electrical isolation may prevent parasitic capacitance of the ELGs 410 from interfering with operation of other elements on the slider 120.

In one embodiment, the electrical isolation of the elements on the slider 120 may prevent electrically active elements (e.g., ELGs 410) from being exposed on the air bearing surface (ABS, e.g., the side of the slider 120 facing the hard disk 112) of the slider 120 during operation of the hard disk drive 100. For example, during operation of the hard disk drive 100, the connection pads for the ELGs may not be connected (e.g., after debonding) to any electrical potential (e.g., a potential voltage source), such that the ELGs 410 may be inert. In some cases, by preventing electrically active elements from being exposed on the ABS, possible negative effects such as discharge from the active elements or corrosion of the hard disk 112 may be prevented or reduced.

Figure 12:
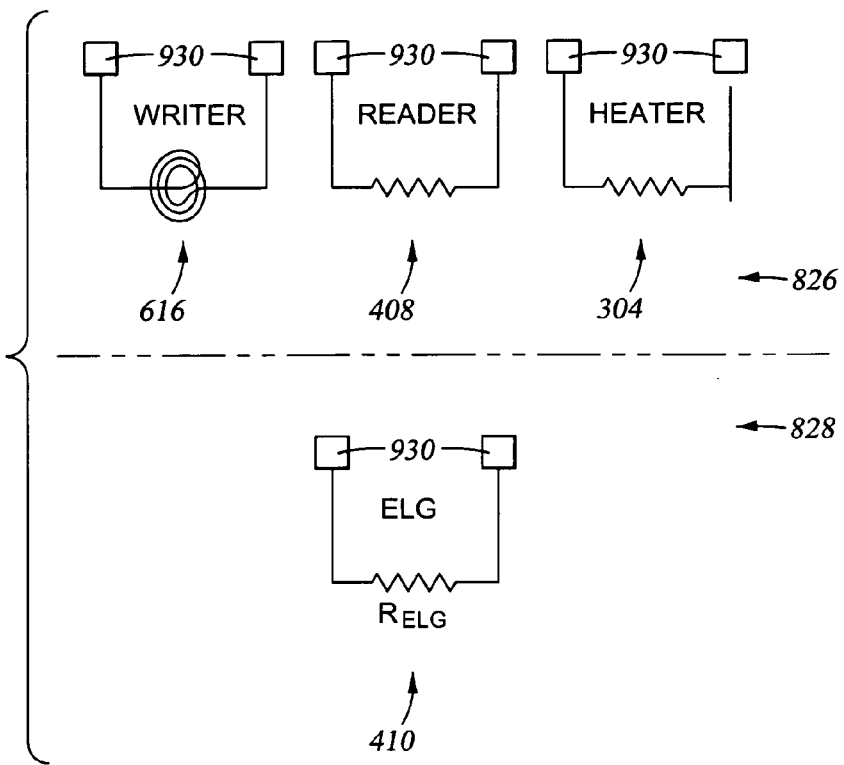
FIG. 12 is a circuit diagram depicting electrical isolation between elements on a slider according to one embodiment of the invention.

FIG. 12 is a circuit diagram depicting an equivalent circuit with electrical isolation between elements on a slider 120 according to one embodiment of the invention. As depicted, separate contact pads 930 may be provided for each element (e.g., the ELG 410, the heater 304, reader 408, and writer 616), thereby providing electrical isolation of the elements. Also, as depicted, because the ELG 410 may have separate contacts from the other elements on the slider 120, the resistance of the ELG 410 ($R_{ELG}$) may be measured independently, e.g., of the resistances of the heater 304, reader 408, and/or writer 616. Measuring $R_{ELG}$ independently of the resistances of the heater 304, reader 408, and writer 616 may reduce error in the measurement because the resistances of the heater 304, reader 408, and/or writer 616, when sufficiently large and measured together with $R_{ELG}$, may increase error in the measured $R_{ELG}$.

In some cases, extra contact pads 930 (e.g., more than the eight depicted in FIG. 9) may be added to the slider 120. In one embodiment, an extra, shared contact pad may be provided for an extra ELG 410 (thereby bringing the number of contact pads to nine). In some cases, the extra, shared contact pad, which may be placed in the second row 828 of contacts, may be provided without changing the pad size required, for example, to connect the additional ELGs or other elements to the slider suspension interconnect (e.g., on the arm 116).

Figure 13:
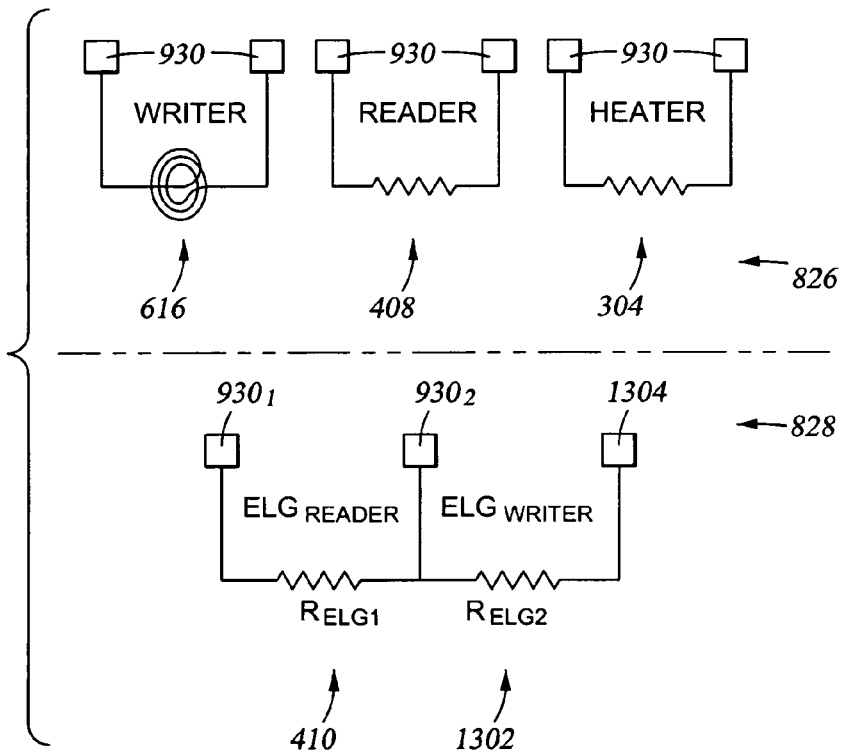
FIG. 13 is a circuit diagram depicting an extra contact pad for an additional ELG according to one embodiment of the invention.

FIG. 13 is a circuit diagram depicting an extra contact pad 1304 for an additional ELG 1302 according to one embodiment of the invention. The first ELG 410 may be used, for example, as a reader ELG ($ELG_{READER}$) whereas the second ELG 1302 may be used as a writer ELG ($ELG_{WRITER}$), thereby allowing more precise lapping for the reader 408 and the writer 616. As depicted, the resistance $R_{ELG1}$ of the reader ELG 410 may be measured with a first contact pad $930_1$ and a second, shared contact pad $930_2$. The resistance $R_{ELG2}$ of the writer ELG 1304 may be measured with the second, shared contact pad $930_2$ and the extra contact pad 1304. Also, as described above, electrical isolation between the ELGs 410, 1304 and other elements of the slider 120 may be maintained by providing separate contact pads for the ELGs 410, 1304.

While described above with respect to an extra, shared contact pad 1304, in some cases, separate contact pads 930 may be provided for each ELG.

Conclusion

As described above, the ELGs 410, heater 304, reader 408, and writer 616 may be provided with separate connection pads 930. A first row 826 of pads may be provided for the heater 304, reader 408, and writer 616 while a second row 828 of pads 930 may be provided for the ELGs 410. As a result, the heater 304, reader 408, and writer 616 may be electrically isolated from the ELGs 410 (e.g., preventing parasitic capacitance due to the ELGs 410 and preventing electrically active components from being exposed to the ABS) during drive operation. In some cases, extra pads may be added, e.g., to the second row 828 of pads 930, without changing the pad size required by the suspension interconnect. Furthermore, by providing separate pads 930 for the ELGs 410, debonding may only be performed on pads 930 which are not subsequently soldered.

While described above with respect to a hard disk drive 100 which utilizes a heater 304, in some cases, a heater 304 may not be utilized. Also, while described above with respect to a hard disk drive 100 having a single hard disk 112 and a single magnetic read/write head, embodiments of the invention may be utilized with disk drives having multiple hard disks 112 and multiple magnetic read/write heads. Furthermore, while described above with respect to electrically isolated components (e.g., heaters 304, readers 408, and writers 616), in some cases, the components may be connected together through high impedance connections.

While the foregoing is directed to embodiments of the present invention, other and further embodiments of the invention may be devised without departing from the basic scope thereof, and the scope thereof is determined by the claims that follow.

What is claimed is:

1. A slider, comprising:
   a slider body;
   a magnetic reader disposed on the slider body;
   a magnetic writer disposed on the slider body;
   an electronic lapping guide disposed on the slider body;
   a first row of contact pads disposed on the slider body and coupled to the magnetic reader and the magnetic writer; and
   a second row of contact pads disposed on the slider body and coupled to the electronic lapping guide, wherein the first row and second row of contact pads are arranged along separate axes relative to one another and wherein the electronic lapping guide is electrically isolated from the magnetic reader and magnetic writer.

2. The slider of claim 1, further comprising:
   a heater disposed on the slider body and coupled to the first row of contact pads, wherein the heater is electrically isolated from the electronic lapping guide.

3. The slider of claim 1, wherein the second row of contact pads is electrically disconnected from the first row of contact pads.

4. The slider of claim 1, wherein the second row of contact pads is not connected to a potential voltage source.

5. The slider of claim 1, wherein the first row of contact pads are electrically disconnected and the second row of contact pads are wire-bonded.

6. The slider of claim 1, wherein one of the contact pads of the second row of contact pads is a shared contact pad, and wherein the slider further comprises:
   an additional contact pad in the second row of contact pads; and
   an additional electronic lapping guide disposed on the slider body and coupled at a first end to the shared contact pad and coupled at a second end to the additional contact pad.

7. The slider of claim 1, wherein the second row of contact pads is parallel to the first row of contact pads.

8. The slider of claim 1, wherein the first row and second row of contact pads are disposed on the same surface of the slider body.

9. A disk drive, comprising:
   a magnetic disk;

an arm rotatably mounted to move over the magnetic disk; and a slider connected to an end of the arm, wherein the slider comprises:
 a magnetic reader in a first level of a substrate;
 a magnetic writer in a second level of the substrate;
 an electronic lapping guide in the first level of the substrate;
 a first row of contact pads coupled to the magnetic reader and the magnetic writer; and
 a second row of contact pads coupled to the electronic lapping guide, wherein the first row and second row of contact pads are arranged along separate axes relative to one another and wherein the electronic lapping guide is electrically isolated from the magnetic reader and magnetic writer.

10. The disk drive of claim 9, wherein the slider further comprises:
 a heater coupled to the first row of contact pads, wherein the heater is electrically isolated from the electronic lapping guide.

11. The disk drive of claim 9, wherein the second row of contact pads are electrically disconnected from the first row of contact pads.

12. The disk drive of claim 9, wherein the second row of contact pads is not connected to a potential voltage source, and wherein the first row of contact pads is connected via soldering to disk drive circuitry.

13. The disk drive of claim 9, wherein the first row of contact pads are electrically disconnected and the second row of contact pads are wire-bonded.

14. The disk drive of claim 9, wherein one of the contact pads of the second row of contact pads is a shared contact pad, and wherein the slider further comprises:
 an additional contact pad in the second row of contact pads; and
 an additional electronic lapping guide coupled at a first end to the shared contact pad and coupled at a second end to the additional contact pad.

15. The disk drive of claim 9, wherein debonding is performed only on contact pads which are not soldered.

16. The disk drive of claim 9, wherein the first row of contact pads is located along an edge of the slider opposite an air bearing surface of the slider, and wherein the second row of contact pads is parallel to the first row of contact pads and is located along an interior portion of the slider between the air bearing surface and the first row of contact pads.

17. The disk drive of claim 9, wherein the second row of contact pads is parallel to the first row of contact pads.

18. A method of manufacturing a slider, the method comprising:
 forming at least one heater, at least one reader, at least one electronic lapping guide, and at least one writer on the slider;
 forming a first row of contact pads on the slider, wherein the first row of contact pads is coupled to the at least one heater, the at least one reader, and the at least one writer; and
 forming a second row of contact pads on the slider, wherein the first row and second row of contact pads are arranged along separate axes relative to one another and wherein the second row of contact pads is coupled to the at least one electronic lapping guide, and wherein the at least one electronic lapping guide is electrically isolated from the at least one heater, the at least one reader, and the at least one writer.

19. The method of claim 18, further comprising:
 bonding the second row of contact pads;
 performing a lapping process with the at least one electronic lapping guide; and
 de-bonding the second row of contact pads.

20. The method of claim 19, wherein the first row of contact pads remain unconnected during the lapping process.

21. The method of claim 19, further comprising:
 creating connections to the first row of contact pads via soldering.

22. The method of claim 21, wherein the connections to the first row of contact pads via soldering is only created for contact pads which are not de-bonded.

23. The method of claim 18, wherein forming the second row of contact pads comprises forming a shared contact pad coupled to at least one the electronic lapping guide and an additional contact pad, and further comprising:
 forming an additional one or more electronic lapping guides, wherein the additional one or more electronic lapping guides are coupled to the shared contact pad and the additional contact pad.

* * * * *